United States Patent [19]

Terzian et al.

[11] 4,093,260

[45] June 6, 1978

[54] VELOCIPEDE STEERING AND DRIVING ARRANGEMENT

[75] Inventors: Rouben T. Terzian, Chicago; Donald K. Fletchic, Arlington Heights, both of Ill.

[73] Assignee: Marvin Glass & Associates, Chicago, Ill.

[21] Appl. No.: 718,907

[22] Filed: Aug. 30, 1976

[51] Int. Cl.[2] ............................................. B62M 1/02
[52] U.S. Cl. .................................. 280/240; 280/260; 280/282
[58] Field of Search ............... 280/263, 259, 260, 270, 280/234, 240, 242 R, 205, 282, 249, 3, 242 WC, 250; 180/21, 26

[56] References Cited

U.S. PATENT DOCUMENTS

| | | | |
|---|---|---|---|
| 633,612 | 9/1899 | Psimenos | 280/234 |
| 2,814,505 | 11/1957 | Kelly | 280/250 |
| 3,381,973 | 5/1968 | Carr | 280/242 WC X |

FOREIGN PATENT DOCUMENTS

| | | | |
|---|---|---|---|
| 782,867 | 3/1935 | France | 280/261 |

Primary Examiner—Kenneth H. Betts
Attorney, Agent, or Firm—Mason, Kolehmainen, Rathburn & Wyss

[57] ABSTRACT

A velocipede is provided in the form of a carriage supported by swivel wheels and having a drive or propelling wheel for engaging a support surface and propelling the velocipede along the surface. The propelling wheel has an axle secured to the lower end of a generally vertical shaft having a steering wheel at the upper end thereof so that the direction of the propelling wheel, and thus the direction in which the carriage travels, is controlled by turning the steering wheel. The steering wheel shaft and propelling wheel can be turned 360° so that the velocipede can be turned to travel in any direction at any time. The velocipede is propelled by a pair of pedals on a Z shaft secured to a drive gear forming a part of the drive train for driving the propelling wheel. Gears are also provided transmitting rotational force to one end of a spool gear surrounding the steering shaft. The other end of the spool gear engages an annular or circular gear on the propelling wheel to propel the wheel regardless of the direction toward which it is turned.

10 Claims, 6 Drawing Figures

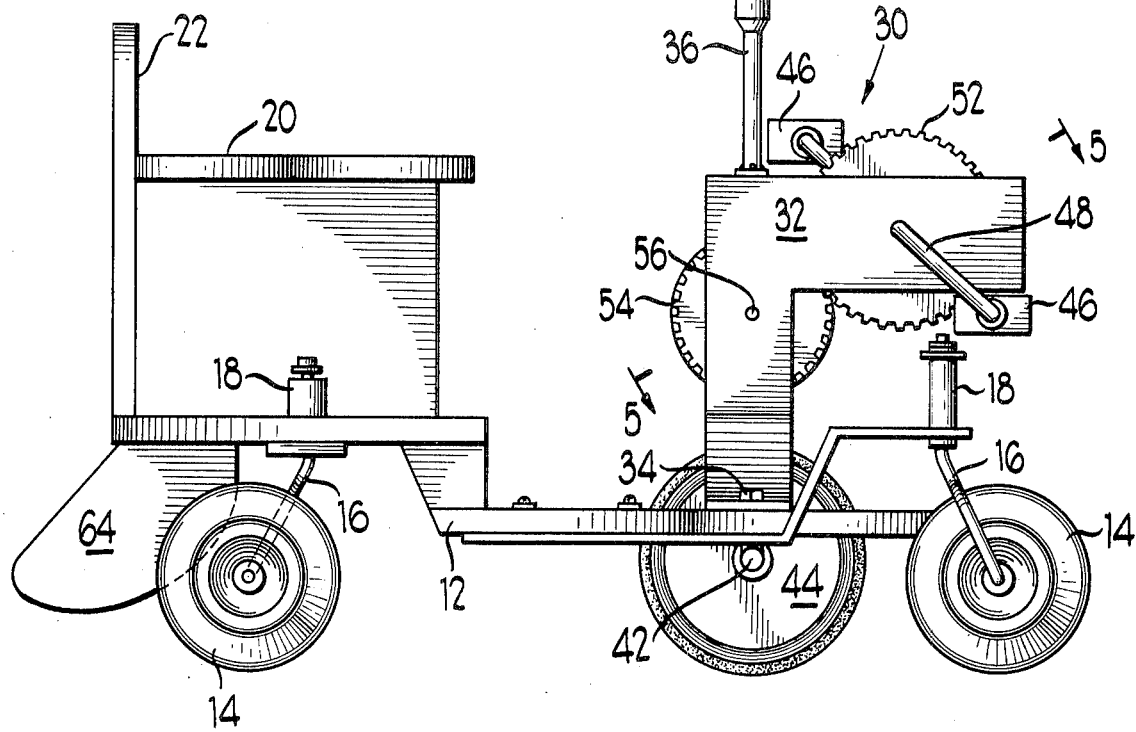
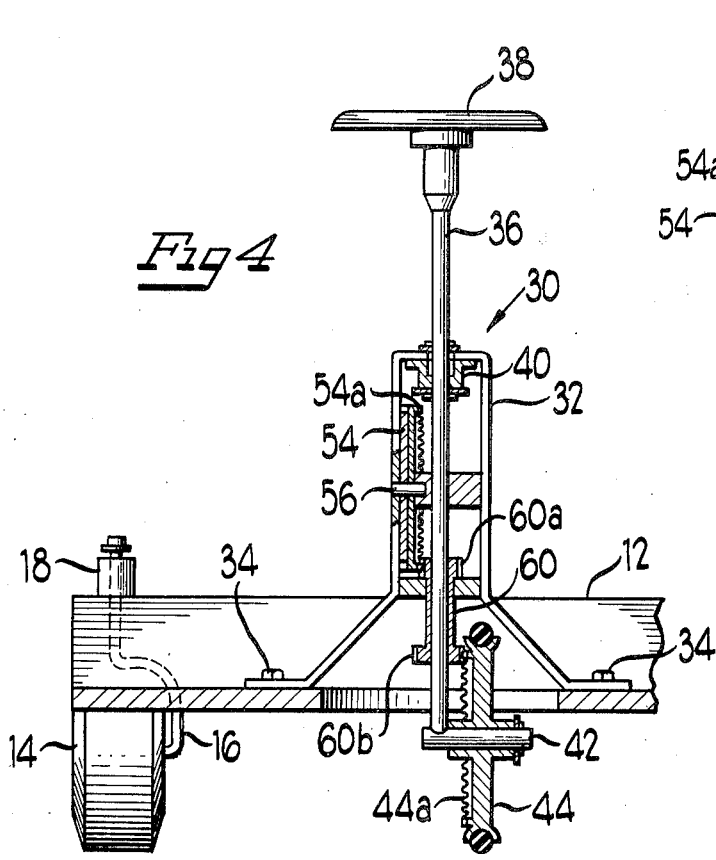
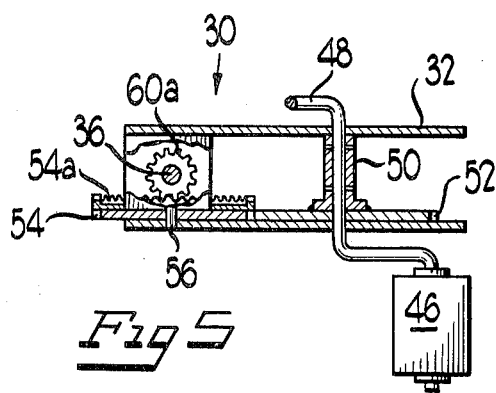
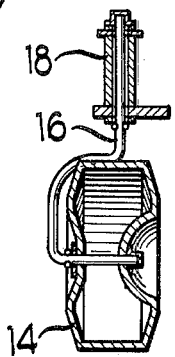

VELOCIPEDE STEERING AND DRIVING ARRANGEMENT

BACKGROUND OF THE INVENTION

1. Field of the Invention

This invention relates to manually or pedally operated velocipedes.

2. Brief Description of the Prior Art

Velocipedes such as bicycles, tricycles and the like have long been known and are commonly used not only for purposes of play but for basic transportation. Such devices are usually pedally operated with the pedals connected to a drive wheel which can be turned for steering purposes so that the pedals are dislocated from convenient driving position with respect to the user of the velocipede. In other such vehicles, the drive wheel is not used for steering purposes and the device cannot be turned to move in every direction throughout a 360° circle.

SUMMARY OF THE INVENTION

The present invention provides a vehicle, e.g., in the form of a toy velocipede, which includes a wheeled carriage having a frame and a drive wheel mounted thereon with a drive system for revolving the drive wheel. The drive wheel engages a support surface for propelling the vehicle thereover during revolution of the drive wheel. The drive wheel is also mounted for pivotal movement on a generally vertical axis throughout a complete 360° circle and is pivotally movable by manually grippable steering means so that the operator can steer the vehicle in any direction. However, the drive input for the drive system remains nonpivotal with respect to the carriage frame so that, regardless of the pivotal disposition of the drive wheel, the drive input can be operated always in the same direction to drive the vehicle. For example, a child sitting on a seat on the carriage frame can pump pedals in a normal forward bicycle manner and change the direction of travel of the vehicle using the steering means without changing the vertical angular disposition of the pedals relative to the seat.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE DRAWINGS

FIG. 3 is an enlarged side view of the velocipede shown in FIG. 1;

FIG. 4 is a section taken generally along the line 4—4 of FIG. 2;

FIG. 5 is a section taken generally along the line 5—5 of FIG. 3; and

FIG. 6 is a section taken generally along line 6—6 of FIG. 2;

DESCRIPTION OF THE PREFERRED EMBODIMENT

Figure 1:
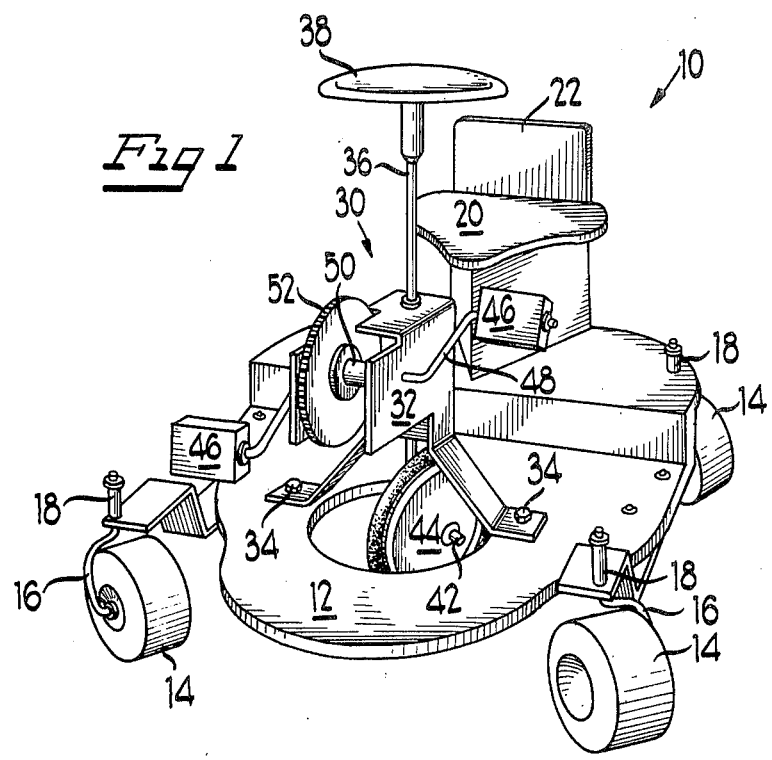
FIG. 1 is a perspective view of an embodiment of the velocipede of the present invention.
Figure 2:
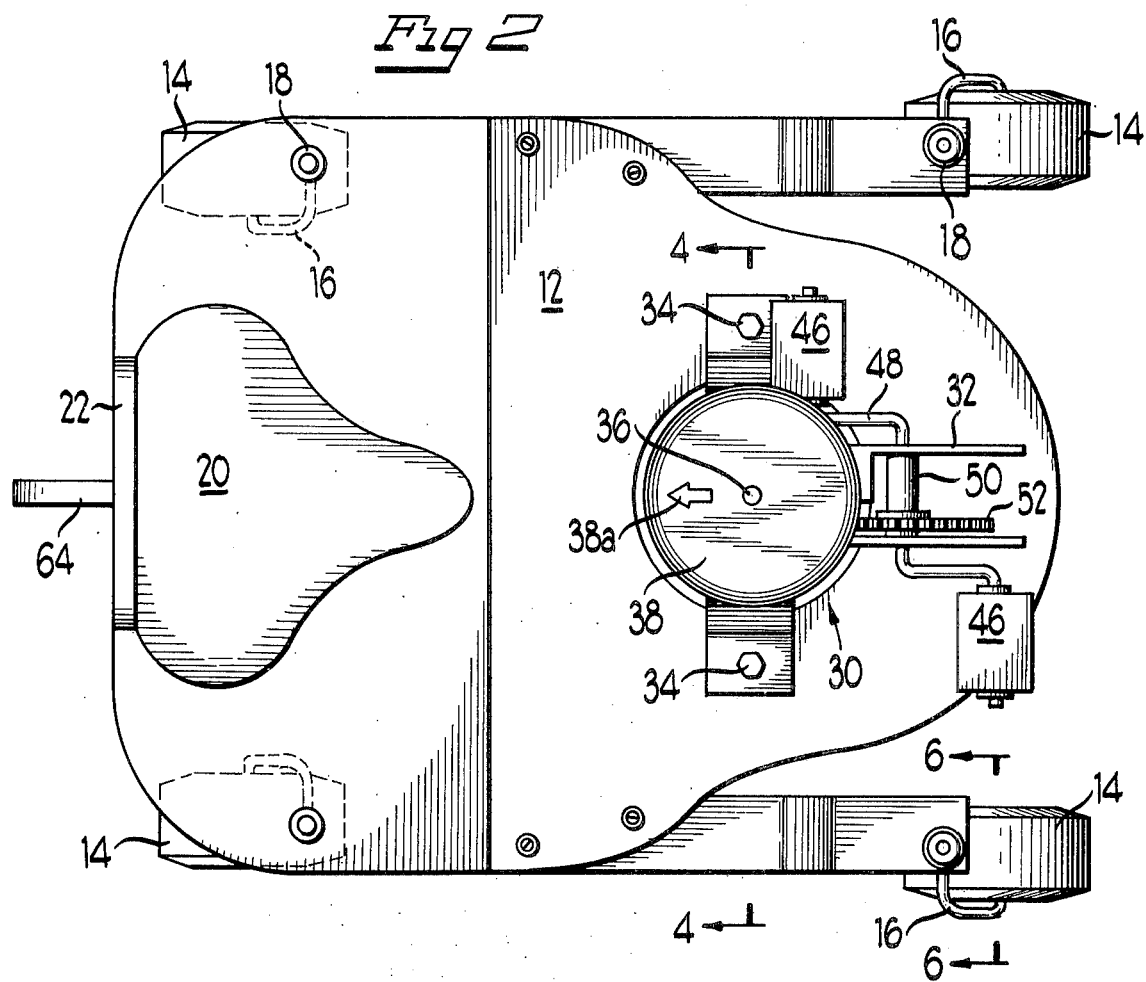
FIG. 2 is an enlarged top plan view of the velocipede shown in FIG. 1.

Referring first to FIGS. 1 through 4 and 6, the illustrated velocipede includes a carriage 10 in the form of a frame 12 having four swivel wheels 14 mounted for rotation on shafts 16 which are in turn secured to frame 12 for swivel movement by way of journals or sleeves 18. An upstanding seat 20 having a backrest 22 is secured to the top of frame 12 for the purpose of supporting the operator of the velocipede. A drive means and steering system generally indicated at 30 (FIGS. 1 through 5) includes an upstanding bifurcated housing or casing 32 which is secured to frame 12 at its bifurcated lower ends by bolts 34.

A shaft 36 upstanding from casing 32 and frame 12 impales the top of casing 32 and is rotatably mounted relative thereto by a trunnion or bearing 40 (FIG. 4). A steering wheel 38 is secured to the top end of shaft 36 and has an arrow 38a (FIG. 2) imprinted thereon to indicate the direction of movement of the velocipede. A shaft 42 (FIGS. 1, 3 and 4) mounts a rubber tired drive wheel 44 for rotation relative thereto. The lower end of steering shaft 36 is secured to shaft or axle 42 abcentral from drive wheel 44 so that, as steering wheel 38 is rotated, thereby rotating shaft 36, drive wheel 44 is turned abcentral of the axis of steering shaft 36. Thus, as the velocipede moves along a support surface with drive wheel 44 providing the driving impetus, the vehicle can be turned in any direction throughout 360° using the steering wheel 38.

A drive system is provided for the purpose of driving or rotating drive wheel 44 about its horizontal axis on shaft 42 (FIGS. 1, 2, 3 and 5). Accordingly, operable means including a pair of pedals 46 are provided at opposite ends of a Z shaft 48 which is rotatably mounted through the walls of casing 32 so as to be accessible for manual or pedal operation. The middle portion of shaft 48 between the lateral walls of casing 32 is secured to a sleeve 50 (FIGS. 1, 2 and 5) which in turn is secured to a drive gear 52 (FIGS. 1 through 3 and 5) which is enmeshed with an idler gear 54 mounted for rotation on a pin 56. Thus, normal pedal operation of pedals 46 rotate the drive gear 52 and the idler gear 54. Idler gear 54, as best seen in FIG. 4, has a circular laterally extending crown gear portion 54a which is enmeshed with the top gear portion 60a of a spool gear 60 (FIGS. 4 and 5) which defines a linkage means or support. The bottom portion 60b of a spool gear 60 is in turn enmeshed with a laterally extending crown gear portion 44a of wheel 44 so that when the pedals 46 are operated the drive wheel 44 is rotated. A forward pumping action on the pedals 46 will cause driving movement of the velocipede in the direction of the arrow 38a on steering wheel 38 while a rearward pumping action will cause movement of the velocipede in the opposite direction. However, regardless of the direction of pumping action, the steering wheel 38 is used to direct the drive wheel 44 and the direction of movement of the velocipede in any direction throughout the full 360° rotatability of shaft 36 and wheel 44. The disposition of the pedals 46 with regard to the operator seated upon seat 20 remains the same regardless of the direction of movement of the velocipede because the pedals 46 do not turn with wheel 44.

A rear fin or bumper 64 is secured to frame 12 for the purpose of preventing spilling or flipping backward of the velocipede during operation since the bumper 64 will engage the support surface and stop such spilling or flipping. Further, in one modification of the invention, the forward swivel wheels 14 can be removed so that the drive wheel 44 becomes the sole support for the front portion of the velocipede and the velocipede can be tilted backwardly onto fin 64. Also, in any construction either the front or rear wheels, especially the rear wheels, can be on a fixed rotational axis relative to the carriage, e.g., the rear wheels can obviously be on fixed axes when the front wheels are removed.

The foregoing detailed description has been given for clearness of understanding only and no unnecessary limitations should be understood therefor as some modifications will be obvious to those skilled in the art.

We claim:

1. A vehicle, comprising: a carriage, propelling means movably mounted on the carriage for engaging a support surface to propel said carriage over the support surface, manually operable means on the carriage for driving said propelling means, steering means mounted on said carriage and operatively associated with said propelling means for moving said propelling means to steer the vehicle, said steering means including a generally vertical shaft mounted on the carriage and a horizontal shaft on the lower end of said shaft for mounting said propelling means, linkage means between said operable means and said propelling means permitting steering movement thereof by said steering means relative to said operable means and said carriage and a plurality of universally mounted support wheels for supporting the carriage for movement in any direction over the support surface.

2. The device of claim 1 wherein said linkage means includes drive train means in the form of a series of intermeshed gears including a spool gear interconnecting said operable means with said propelling means.

3. The device of claim 1 wherein said propelling means is a drive wheel for engaging a support surface over which the carriage is propelled, the wheel being directed by said steering means independently of the operated means.

4. The device of claim 3 wherein said operated means comprises a pair of pedals at opposite ends of a crank shaft.

5. The device of claim 1 in which said propelling means is a support wheel for said carriage.

6. The device of claim 1 including bumper means secured to the rear end of said carriage for blocking said carriage against overturning rearwardly during operation of the vehicle.

7. A velocipede, comprising: a wheeled carriage having a plurality of supporting swivel wheels and drive means for driving the carriage including a drive wheel for engaging a support surface for propelling said wheeled carriage over the support surface, a steering wheel mounted on a shaft on said carriage for directing said drive wheel, a gear drive train including a spool gear surrounding said steering shaft and engaging a gear means operatively associated with said drive wheel, a pair of pedals on a pedal shaft operatively connected to said drive train for rotating said drive wheel in driving fashion, a seat on said carriage, a steering connection between said steering shaft and said drive wheel for directing said drive wheel by said steering means in any direction throughout a 360° circle independently of said seat or carriage or the operation of said pedals.

8. A vehicle, comprising:
a frame;
drive means movably mounted on the frame for engaging a supporting surface to propel the vehicle over the supporting surface;
manually operable means on the frame for driving said drive means;
steering means mounted on said carriage and operatively associated with said drive means for moving the drive means to steer the vehicle;
said steering means comprising a steering wheel secured to the upper end of a generally vertical steering shaft, the other end of said steering shaft being secured to a horizontal axle upon which the drive means is mounted for rotation; and
said drive means including a spool gear mounted on said steering shaft engaging said manually operable means and said drive means to permit the drive means to turn in any direction to determine the direction of movement of the vehicle.

9. The device of claim 8 wherein said carriage is at least partially supported by at least one swivel wheel.

10. The vehicle of claim 8 including a plurality of universally mounted support wheels on the frame to support the vehicle for movement in any direction on the suitable supporting surface.

* * * * *